United States Patent
Park et al.

(10) Patent No.: US 9,618,716 B2
(45) Date of Patent: Apr. 11, 2017

(54) PHOTONIC INTEGRATED CIRCUIT

(71) Applicant: Samsung Electronics Co., Ltd., Suwon-si, Gyeonggi-do (KR)

(72) Inventors: Sang-Cheon Park, Hwaseong-si (KR); Cha-Jea Jo, Incheon (KR); Tae-Je Cho, Yongin-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 14/988,739

(22) Filed: Jan. 5, 2016

(65) Prior Publication Data

US 2016/0266341 A1 Sep. 15, 2016

(30) Foreign Application Priority Data

Mar. 11, 2015 (KR) ........................ 10-2015-0033505

(51) Int. Cl.
| | |
|---|---|
| *G02B 6/43* | (2006.01) |
| *G02B 6/44* | (2006.01) |
| *G02B 6/122* | (2006.01) |
| *G02B 6/42* | (2006.01) |

(52) U.S. Cl.
CPC ............ *G02B 6/43* (2013.01); *G02B 6/1226* (2013.01); *G02B 6/4283* (2013.01); *G02B 6/4295* (2013.01); *G02B 6/4416* (2013.01); *Y02E 10/52* (2013.01)

(58) Field of Classification Search
CPC .............. G02B 6/43; G02B 6/42; G02B 6/44

USPC .......................................................... 385/14
See application file for complete search history.

(56) References Cited

U.S. PATENT DOCUMENTS

| | | | |
|---|---|---|---|
| 5,863,809 A | 1/1999 | Koren | |
| 7,340,122 B2 | 3/2008 | Welch et al. | |
| 7,466,880 B2 * | 12/2008 | Windover | 385/14 |
| 7,747,111 B2 | 6/2010 | Yanagisawa | |
| 7,994,041 B2 | 8/2011 | Lim et al. | |
| 8,005,326 B2 | 8/2011 | Chang et al. | |
| 8,165,429 B2 * | 4/2012 | Lee et al. | 385/14 |
| 8,422,837 B2 * | 4/2013 | Nishi et al. | 385/14 |
| 8,791,550 B1 | 7/2014 | Gu et al. | |
| 8,861,917 B2 * | 10/2014 | Kim | 385/131 |
| 2010/0078546 A1 | 4/2010 | Kyoung | |
| 2013/0236189 A1 | 9/2013 | Yamamoto et al. | |
| 2014/0131549 A1 * | 5/2014 | Kaskoun et al. | 250/206 |
| 2015/0372759 A1 * | 12/2015 | Lim et al. | 385/14 |

FOREIGN PATENT DOCUMENTS

| | | |
|---|---|---|
| JP | 5318978 | 7/2012 |
| KR | 20080091739 A | 10/2008 |
| KR | 20090028435 A | 3/2009 |
| KR | 101025013 | 3/2011 |

(Continued)

*Primary Examiner* — Kaveh C Kianni
(74) *Attorney, Agent, or Firm* — Renaissance IP Law Group LLP

(57) ABSTRACT

A photonic integrated circuit is provided. The photonic integrated circuit includes a substrate having a through hole interconnecting a first surface and a second surface; a transmission wire passing through the through hole and including an optical transmission structure and an electrical transmission structure; and an optical-to-electrical converter connected to the optical transmission structure of the transmission wire on the first surface.

19 Claims, 25 Drawing Sheets

(56) References Cited

FOREIGN PATENT DOCUMENTS

| KR | 20130006287 A | 1/2013 |
|----|---------------|--------|
| KR | 101262909 | 5/2013 |
| WO | 2009107742 A1 | 9/2009 |
| WO | 2012090271 A1 | 7/2012 |

* cited by examiner

8

PHOTONIC INTEGRATED CIRCUIT

CROSS-REFERENCE TO RELATED APPLICATION

This application claims priority from Korean Patent Application No. 10-2015-0033505 filed on Mar. 11, 2015 in the Korean Intellectual Property Office, and all the benefits accruing therefrom under 35 U.S.C. 119, the contents of which in its entirety are herein incorporated by reference.

BACKGROUND

1. Technical Field

This disclosure relates to a photonic integrated circuit.

2. Description of the Related Art

Semiconductor integrated circuits have used electric communication that electrically transmits/receives data. Semiconductor integrated circuits are integrated on a printed circuit board, and perform electric communication with each other through interconnections. However, reducing electric resistance between the semiconductor integrated circuits has limitations. Thus, it is difficult to increase the speed of signal transfer between the semiconductor integrated circuits due to the limitations in the electric resistance.

Recently, optical interconnection or optical communication has been adopted to improve communication speed between semiconductor integrated circuits. Optical communication transmits and/or receives an optical signal having information stored therein. When compared with electric communication, optical communication may experience less interference caused by external electromagnetic waves and enables higher speed communication. A circuit that uses such optical communication is called as a photonic integrated circuit.

SUMMARY

An embodiment includes a photonic integrated circuit comprising: a substrate having a through hole interconnecting a first surface and a second surface; a transmission wire passing through the through hole and including an optical transmission structure and an electrical transmission structure; and an optical-to-electrical converter connected to the optical transmission structure of the transmission wire on the first surface.

An embodiment includes a photonic integrated circuit, comprising: a substrate having a first through hole and a second through hole interconnecting a first surface and a second surface; a first transmission wire and a second transmission wire passing through the first through hole and the second through hole, respectively, the first transmission wire including an optical transmission structure and an electrical transmission structure; and an optical-to-electrical converter connected to the optical transmission structure of the first transmission wire on the first surface; wherein the first transmission wire and the second transmission wire are electrically connected or optically connected.

An embodiment includes a photonic integrated circuit comprising: a first substrate having a first through hole interconnecting a first surface and a second surface of the first substrate; a second substrate stacked on the first substrate and having a second through hole interconnecting a first surface and a second surface of the second substrate; a first transmission wire passing through the first through hole and including an optical transmission structure and an electrical transmission structure; an optical-to-electrical converter connected to the optical transmission structure of the first transmission wire on the first surface; a second transmission wire passing through the second through hole; wherein the second transmission wire is electrically connected to the electrical transmission structure.

DETAILED DESCRIPTION OF THE EMBODIMENTS

Figure 1:
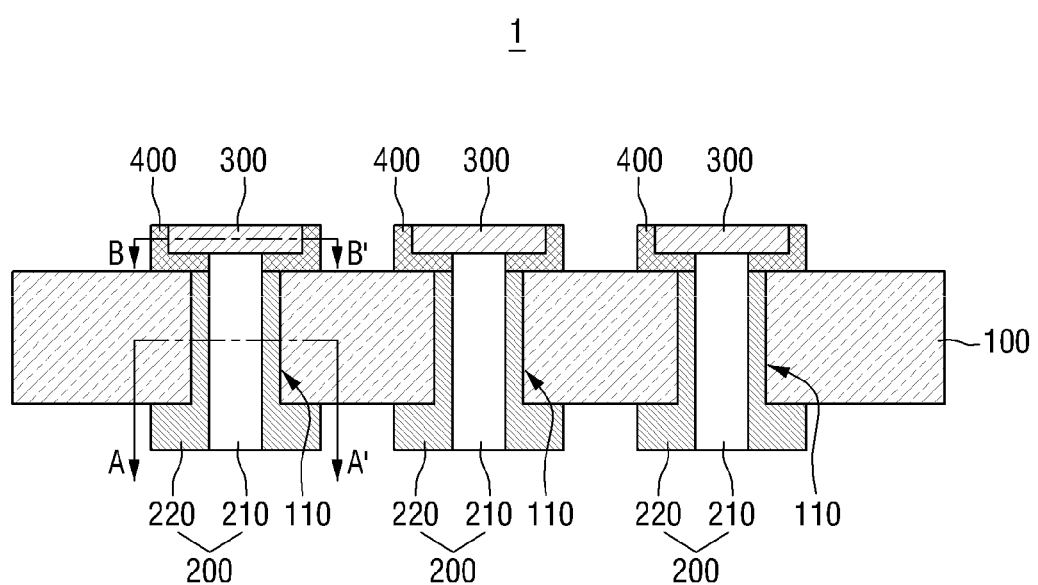
FIG. 1 is a cross-sectional view for describing a photonic integrated circuit according to a first embodiment.

Embodiments will now be described more fully hereinafter with reference to the accompanying drawings, in which particular embodiments are shown. Embodiments may, however, take other different forms and should not be construed as limited to the particular embodiments set forth herein. Rather, these embodiments are provided so that this disclosure will be thorough and complete, and will fully convey the scope to those skilled in the art. The same reference numbers indicate the same components throughout the specification. In the attached figures, the thickness of layers and regions is exaggerated for clarity.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present. Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art. It is noted that the use of any and all examples, or exemplary terms provided herein is intended merely for better understanding and not as a limitation on the scope unless otherwise specified. Further, unless defined otherwise, all terms defined in generally used dictionaries may not be overly interpreted.

A photonic integrated circuit according to a first embodiment will now be described with reference to FIGS. 1 to 3.

FIG. 1 is a cross-sectional view for describing the photonic integrated circuit according to the first embodiment. FIG. 2 is a cross-sectional view taken along the line A-A' of FIG. 1. FIG. 3 is a top view taken along the line B-B' of FIG. 1.

Referring to FIG. 1, a photonic integrated circuit 1 according to the first embodiment includes a substrate 100, transmission wire 200, a converter 300 and an electrical terminal 400.

The substrate 100 may include any substrate on which a photonic integrated circuit may be formed. For example, the substrate 100 may include a rigid substrate such as a silicon substrate, a silicon on insulator (SOI) substrate, a gallium arsenide substrate, a silicon germanium substrate, a ceramic substrate, a quartz substrate or a glass substrate for a display, or a flexible plastic substrate such as a polyimide substrate, a polyester substrate, a polycarbonate substrate, a polyethersulfone substrate, a polymethylmethacrylate substrate, a polyethylene naphthalate substrate and a polyethyleneterephthalate substrate.

The substrate 100 may include a first surface and a second surface. The first surface and the second surface may be directed in mutually opposite directions relative to the substrate 100. That is, the first surface and the second surface may be an upper surface and a lower surface of the substrate 100, respectively, or a lower surface and an upper surface of the substrate 100, respectively.

The substrate 100 may include a through hole 110. The through hole 110 may interconnect the first surface and the second surface of the substrate 100. That is, the through hole 110 may penetrate through an interior of the substrate 100 to form a via structure. As shown in FIG. 1, the through hole 110 may interconnect the upper surface and the lower surface of the substrate 100. The photonic integrated circuit 1 may include at least one through hole 110. That is, the through hole 110 may be singular or plural in number.

The transmission wire 200 may pass through the through hole 110. Like the through hole 110, the photonic integrated circuit 1 may include at least one transmission wire 200. Thus, the transmission wires 200 may pass through the respective through holes 110 in a one-to-one correspondence. That is, the transmission wires 200 may correspond one-to-one with the through holes 110.

The transmission wire 200 may be configured to transmit a first electrical signal and an optical signal. The transmission wire 200 may provide both a path for transmitting the first electrical signal and a path for transmitting the optical signal. The transmission wire 200 may include an optical transmission line 210 for transmitting the optical signal and an electrical transmission film 220 for transmitting the first electrical signal. The optical transmission line 210 is an example of an optical transmission structure configured to transmit an optical signal; however, in other embodiments, other structures may be used. The electrical transmission film 220 is an example of an electrical transmission line configured to transmit an electrical signal; however, in other embodiments, other structures may be used.

The transmission wire 200 may include both a region for entry of the optical signal (optical transmission line region) and a region for entry of the first electrical signal (electrical transmission film region) at the second surface (the lower surface in the drawing) of the substrate 100.

Figure 2:
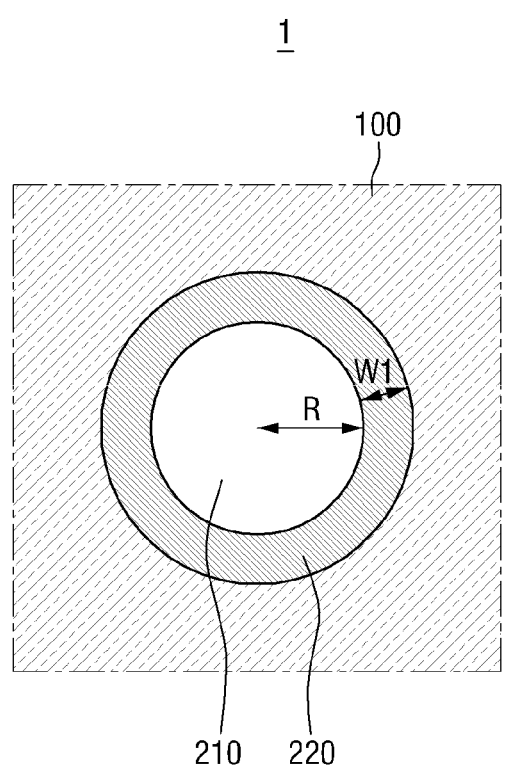
FIG. 2 is a cross-sectional view taken along the line A-A' of FIG. 1.

Referring to FIG. 2, the optical transmission line 210 of the transmission wire 200 may be positioned in a core of the transmission wire 200. The optical transmission line 210 may have a circular cross section having a predetermined radius R. The optical transmission line 210 may extend into a cylindrical shape. The optical transmission line 210 may be, for example, an optical fiber. An optical fiber is a thin fiber having a core with a higher refractive index of light and a peripheral part with a lower refractive index of light to produce an optical phenomenon of total internal reflection in the core of the fiber. Since the total internal reflection occurs in the core of the fiber, loss of an optical signal can be reduced if not prevented, and, differently from a transmission of an electrical signal where a resistance may exist, the optical signal can be transmitted in the speed of light in the optical fiber, to thereby enable rapid communication.

The optical transmission line 210 may serve as a path for transmitting the optical signal. The optical signal transmitted through the optical transmission line 210 may pass through the through hole 110 and may be converted into a second electrical signal by the converter 300. This will be explained below.

The electrical transmission film 220 may surround an outer surface of the optical transmission line 210. The electrical transmission film 220 may serve as a reflective layer for preventing reflection of the optical signal passing through the optical transmission line 210. The electrical transmission film 220 may have a thickness W1 which can be sufficiently thick to serve as the reflective layer.

The electrical transmission film 220 may include a conductor. Thus, the electrical transmission film 220 may serve as a path for transmitting the first electrical signal. The electrical transmission film 220 may completely surround the outer surface of the circular optical transmission line 210. In this case, the thickness of the electrical transmission film 220 may be maintained constant along the outer surface of the optical transmission line 210. However, the term "constant" herein means a concept including the same value but also including all tolerances, fine step differences, variations, or the like caused during a manufacturing process.

As the thickness of the electrical transmission film 220 may be maintained constant, the electrical transmission film 220 may have resistance which is constant along the direction of the outer surface of the optical transmission line 210. Thus, the transmission of the first electrical signal through the electrical transmission film 220 may be performed in a uniform and smooth manner. The uniform transmission of the first electrical signal may raise a temperature and improve characteristics of durability of a device.

The first electrical signal transmitted through the electrical transmission film 220 may be a signal of direct current or alternating shaped current voltage. That is, power or a signal can be supplied through the electrical transmission film 220. For example, the electrical transmission film 220 may serve to supply power to a circuit or the like connected to an end of the transmission wire 200.

When multiple through holes 110 and multiple transmission wires 200 corresponding to the through holes 110 are present, multiple electrical transmission films 220 may also be present corresponding to the multiple through holes 110 and multiple transmission wires 200. In this case, electrical transmission films 220 may serve as a power supply and a ground, respectively. That is, electrical transmission films 220 adjacent with each other may transmit electrical signals having different electric potentials. However, embodiments not limited thereto.

Referring back to FIG. 1, the converter 300 may be configured to convert the optical signal into the second electrical signal. In this case, the second electrical signal may differ from the first electrical signal transmitted through the electrical transmission film 220. Specifically, the first electrical signal may be an electrical signal for supplying power, and the second electrical signal may be an electrical signal for an input value of a circuit.

The converter 300 may be configured to convert an optical signal from light into an electrical signal. For example, the converter 300 may include a photo diode, a photo transistor, or other optical to electrical conversion device. That is, the converter 300 may be configured to take an optical signal as an input and generate an electrical signal as an output in response to the optical signal.

The converter 300 may be connected directly to the optical transmission line 210. That is, the optical transmission line 210 may be formed to directly contact a lower surface of the converter 300. The converter 300 may be configured to receive the optical signal from the optical transmission line 210, convert the optical signal into the second electrical signal and output the second electrical signal. The second electrical signal may be used in other parts of the photonic integrated circuit.

The electrical terminal 400 may be connected to the electrical transmission film 220 of the transmission wire 200. The electrical terminal 400 may be configured to receive the first electrical signal transmitted through the electrical transmission film 220. As described above, the transmission of the first electrical signal may be supply of power. Thus, the electrical terminal 400 may be a terminal for receiving power; however, in other embodiments, the first electrical signal may be a signal containing information beyond power.

Figure 3:
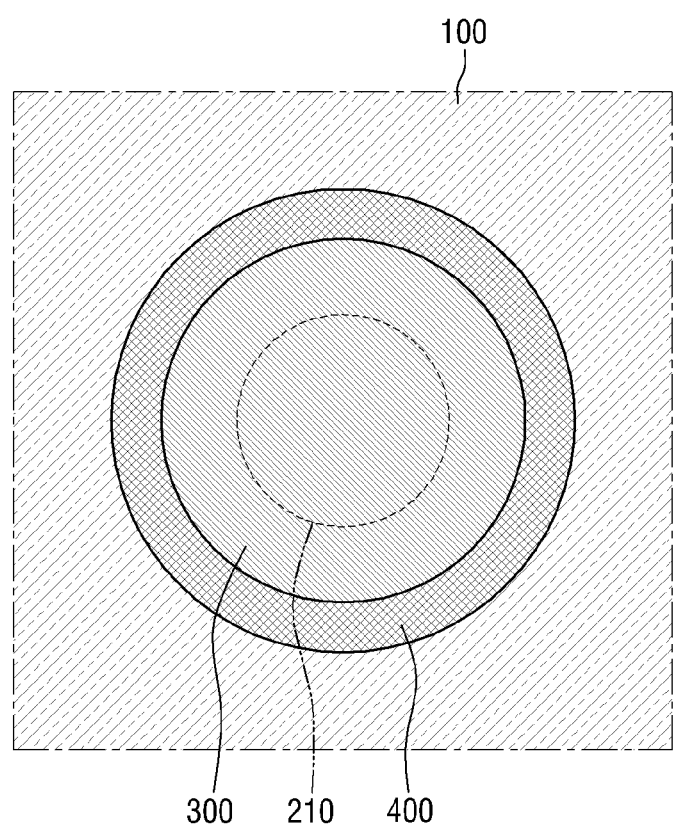
FIG. 3 is a top view taken along the line B-B' of FIG. 1.

Referring to FIG. 3, the electrical terminal 400 may be formed to surround a part of an outer surface of the converter 300. For example, the electrical terminal 400 may be formed to contact a lower surface and a side surface of the converter 300 as shown in FIGS. 1 and 3. However, as shown in the drawings, since the converter 300 should directly contact the optical transmission line 210, a part of the outer surface of the converter 300 may not be covered by the electrical terminal 400.

When the converter 300 and the electrical terminal 400 contact each other as shown in the drawings, the photonic integrated circuit 1 according to an embodiment may have an improved degree of integration. That is, the two elements which were separated from each other may be formed adjacently each other, a higher degree of integration of the photonic integrated circuit 1 may be achieved, and thus the photonic integrated circuit 1 may have an improved performance per unit area.

Although the converter 300 and the electrical terminal 400 are depicted as having a circular outer surface in FIG. 3, it is a merely an illustrative example, and the converter 300 and the electrical terminal 400 may have a polygonal shape and the like. That is, there are no restrictions in the shapes of the electrical terminal 400 and the converter 300 as long as the electrical terminal 400 surrounds the outer surface of the converter 300.

The photonic integrated circuit 1 according to the first embodiment may have through holes 110 and transmission wires 200 in a one-to-one correspondence and simultaneously transmit an optical signal and an electrical signal. Thus, the degree of integration of the photonic integrated circuit 1 may be significantly improved, and the number of the through holes 110 formed may be reduced to achieve improved efficiency of process.

A photonic integrated circuit according to the second embodiment will now be described with reference to FIG. 4. Explanations of the parts similar to the parts of the first embodiment will be omitted or brief.

Figure 4:
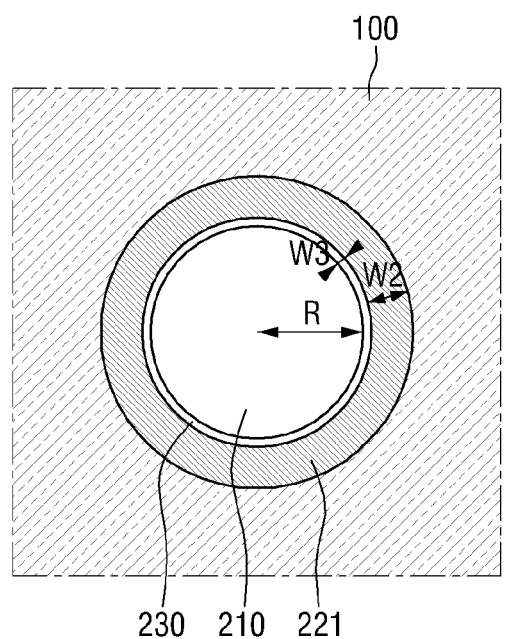
FIG. 4 is a cross-sectional view for describing a photonic integrated circuit according to a second embodiment.

FIG. 4 is a cross-sectional view for describing the photonic integrated circuit according to the second embodiment. FIG. 4 is a cross-sectional view of the second embodiment corresponding to FIG. 2 of the first embodiment.

Referring to FIG. 4, the optical transmission line 210 of the transmission wire 200 of a photonic integrated circuit 2 according to the second embodiment is similar to that of the first embodiment in that the optical transmission line 210 includes optical fiber having a circular cross section and an electrical transmission film 221 is formed to surround the outer surface of the optical transmission line 210. However, a reflective layer 230 may further be interposed between the optical transmission line 210 and the electrical transmission film 221.

The reflective layer 230 may completely surround the outer surface of the optical transmission line 210. An optical fiber will be used as an example of the optical transmission line 210. The reflective layer 230 surrounding the optical fiber may reflect the optical signal in the optical fiber such that the optical signal is not transmitted out of the optical fiber. The reflective layer 230 may be formed of a material having a refractive index smaller than that of the optical fiber.

The reflective layer 230 may have a thickness W3 thinner than the radius R of the optical transmission line 210 or a thickness W2 of the electrical transmission film 221. As the thickness of the reflective layer 230 is added, the thickness W2 of the electrical transmission film 221 may become thinner than the thickness W1 of the electrical transmission film (220 of FIG. 2) of the photonic integrated circuit 1 according to the first embodiment. That is, since the electrical transmission film 221 does not need to serve as a reflective layer, the electrical transmission film 221 may become thinner, and thus the degree of integration of the photonic integrated circuit 2 may be further improved.

A photonic integrated circuit according to the third embodiment will now be described with reference to FIG. 5. Explanations of the parts similar to the parts of the first and second embodiments will be omitted or brief.

Figure 5:
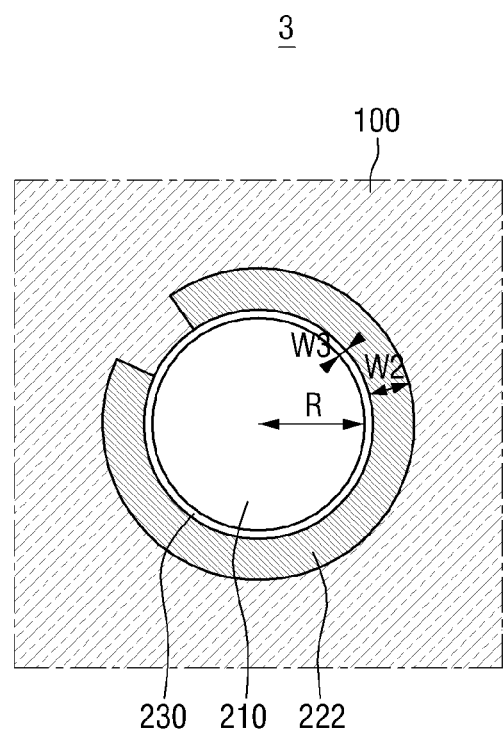
FIG. 5 is a cross-sectional view for describing a photonic integrated circuit according to a third embodiment.

FIG. 5 is a cross-sectional view for describing the photonic integrated circuit according to the third embodiment. FIG. 5 is a cross-sectional view of the third embodiment corresponding to FIGS. 2 and 4 of the first and second embodiments.

Referring to FIG. 5, an electrical transmission film 222 of a photonic integrated circuit 3 according to the third embodiment may not completely surround and thus expose a part of outer surfaces of the optical transmission line 210 and the reflective layer 230. Since the reflective layer 230 of the optical transmission line 210 exists, the electrical transmission film 222 does not need to reflect the optical signal in the optical transmission line 210, and thus it is possible to form the electrical transmission film 222 such that the electrical transmission film 222 does not completely surround the outer surfaces of the optical transmission line 210 and the reflective layer 230.

Thus, the electrical transmission film 222 of the photonic integrated circuit 3 according to the third embodiment may contact only a part of the outer surface of the reflective layer 230 and expose a part of the outer surface of the reflective layer 230. Accordingly, a design in which a part of the electrical transmission film 222 is absent in one direction so as to ensure a margin with other adjacent element (same transmission line and the like) can be accepted. Thus, the degree of integration of the photonic integrated circuit 3 can be further improved.

Although the absent part of the electrical transmission film 222 is depicted as being relatively small in the drawing, other embodiments are not limited thereto. That is, the absent part of the electrical transmission film 222 may be formed as relatively small as possible, but other embodiments are not limited thereto.

A photonic integrated circuit according to a fourth embodiment will now be explained with reference to FIG. 6. Explanations of the parts similar to the parts of the first to third embodiments will be omitted or brief.

Figure 6:
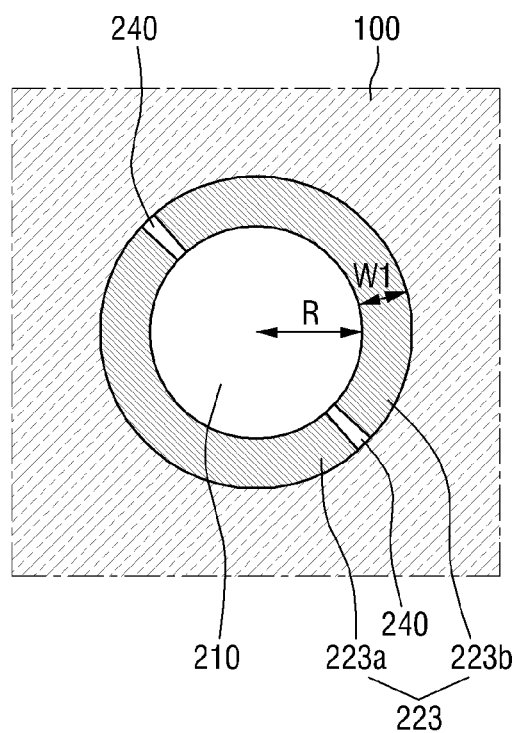
FIG. 6 is a cross-sectional view for describing a photonic integrated circuit according to a fourth embodiment.

FIG. 6 is a cross-sectional view for describing the photonic integrated circuit according to the fourth embodiment. FIG. 6 is a cross-sectional view of the fourth embodiment corresponding to FIG. 2 of the first embodiment.

Referring to FIG. 6, an electrical transmission film 223 of a photonic integrated circuit 4 according to the fourth embodiment may include multiple sub electrical transmission films 223 and an insulation film 240.

The sub electrical transmission films 223 may include a first sub electrical transmission film 223a and a second sub electrical transmission film 223b. The sub electrical transmission films 223 may be electrically insulated from each other. That is, each sub electrical transmission film 223 may transmit different electrical signals.

The insulation film 240 may be formed between the sub electrical transmission films 223. Although the sub electrical transmission films 223 are depicted as two in FIG. 6, the number of the sub electrical transmission films 223 is not restricted as long as the number more than one. Multiple insulation films 240 may be present. The insulation film 240 may electrically insulate the sub electrical transmission films 223 from each other. That is, the insulation film 240 may include an insulator to prevent flow of electricity.

When the electrical transmission film supplies power, the first sub electrical transmission film 223a and the second sub electrical transmission film 223b may perform, for example, power supply operation and grounding operation, respectively. That is, two types of wires can be utilized in a single transmission wire, thereby providing the photonic integrated circuit 4 having higher degree of integration.

A photonic integrated circuit according to a fifth embodiment will now be explained with reference to FIG. 7. Explanations of the parts similar to the parts of the first to fourth embodiments will be omitted or brief.

Figure 7:
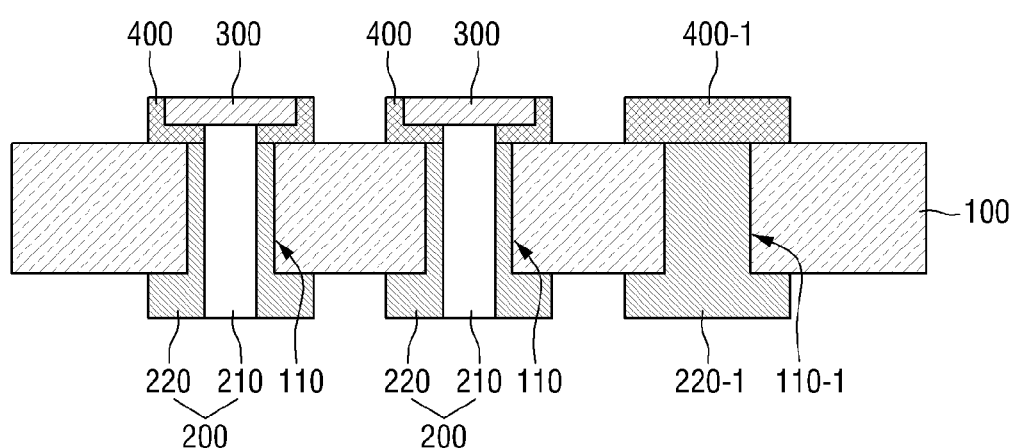
FIG. 7 is a cross-sectional view for describing a photonic integrated circuit according to a fifth embodiment.

FIG. 7 is a cross-sectional view for describing the photonic integrated circuit according to the fifth embodiment.

Referring to FIG. 7, a photonic integrated circuit 5 according to the fifth embodiment may include a first through hole 110, a first transmission wire 200 and a first electrical terminal 400 similar to the through hole 110, the transmission wire 200 and the electrical terminal 400 of FIG. 1. Multiple such structures may be present. The photonic integrated circuit 5 may further include a second through hole 110-1, an electrical transmission wire 220-1 and a second electrical terminal 400-1.

The second through hole 110-1 may interconnect the first surface and the second surface of the substrate 100 like the first through hole 110 of the substrate 100. The electrical transmission wire 220-1 may pass through the second through hole 110-1. The electrical transmission wire 220-1 may be configured to transmit an electrical signal. The second electrical terminal 400-1 may be connected to the electrical transmission wire 220-1. The second electrical terminal 400-1 may configured to receive the electrical signal transmitted through the electrical transmission wire 220-1. The second electrical terminal 400-1 may be a terminal for receiving power when the electrical transmission wire 220-1 supplies power.

The photonic integrated circuit 5 according to the fifth embodiment may transmit an electrical signal mainly through the electrical transmission wire 220-1, and may use the first transmission wire 200 in an auxiliary transmission of an electrical signal. That is, although the first transmission wire 200 may transmit both an optical signal and an electrical signal, the first transmission wire 200 alone may not transmit a sufficient amount of electrical signal, and thus the electrical transmission wire 220-1 may be arranged to transmit an electrical signal.

Thus, the photonic integrated circuit 5 may partially improve the degree of integration thereof while fully performing the function of transmitting an electrical signal or supplying power. That is, the electrical signal transmission volume of at least one electrical transmission wire 220-1 is shared with the transmission wire 200. That is, the an electrical transmission wire 220-1 may be electrically connected to the transmission wire 200. As a result, the degree of integration may be improved without sacrifice of the reliability in transmitting the electrical signal.

Although an electrical signal may be shared between the electrical transmission wire 220-1 and the transmission wire 200, in some embodiments, the electrical signal in the electrical transmission wire 220-1 may be different from an electrical signal in the transmission wire 200. For example, the electrical transmission wire 220-1 may be configured to transmit a data signal while the transmission wire 200 may be configured to supply power. Accordingly, in such an embodiment, the electrical transmission wire 220-1 may be electrically insulated from the transmission wire 200.

A photonic integrated circuit according to a sixth embodiment will now be explained with reference to FIG. 8. Explanations of the parts similar to the parts of the first to fifth embodiments will be omitted or brief.

Figure 8:
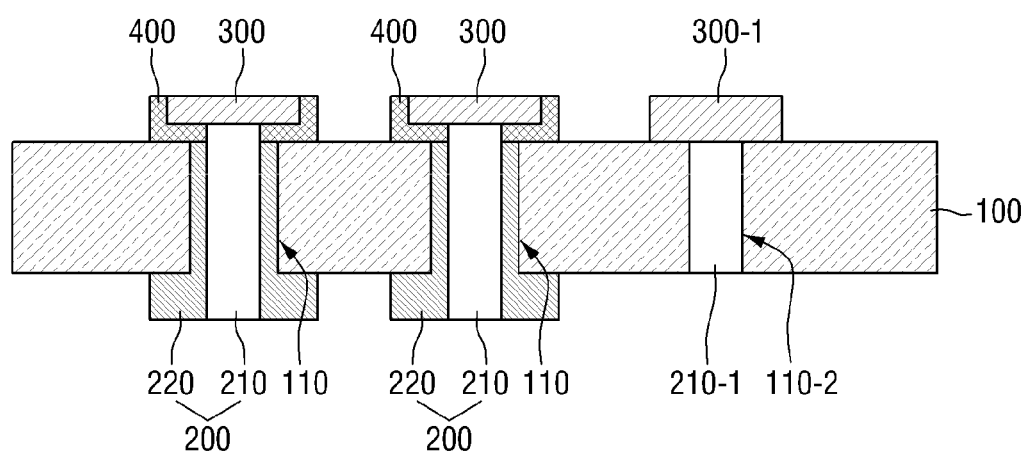
FIG. 8 is a cross-sectional view for describing a photonic integrated circuit according to a sixth embodiment.

FIG. 8 is a cross-sectional view for describing the photonic integrated circuit according to the sixth embodiment.

Referring to FIG. 8, a photonic integrated circuit 6 according to the sixth embodiment may include a first through hole 110, a first optical transmission line 210 and a first converter 300 similar to the through hole 110, the optical transmission line 210 and the converter 300 of FIG. 1. Multiple such structures may be present. In addition, the photonic integrated circuit 6 may further include a third through hole 110-2, a second optical transmission line 210-1 and a second converter 300-1.

The third through hole 110-2 may interconnect the first surface and the second surface of the substrate 100 like the first through hole 110 of the substrate 100. The second optical transmission line 210-1 may pass through the third through hole 110-2. The second optical transmission line 210-1 may be configured to transmit an optical signal. The second converter 300-1 may be connected to the second optical transmission line 210-1. The second converter 300-1 may be configured to receive the optical signal transmitted through the second optical transmission line 210-1. The second converter 300-1 may be configured to convert the optical signal into an electrical signal.

The photonic integrated circuit 6 according to the sixth embodiment may be configured to transmit an optical signal separately through the first optical transmission line 210 and the second optical transmission line 210-1. That is, although the transmission wire 200 may be configured to transmit both an optical signal and an electrical signal, the reliability of the optical signal may be degraded when using the first optical transmission line 210 alone, and thus the second optical transmission line 210-1 may be arranged for an additional transmission of an optical signal.

Thus, the photonic integrated circuit 6 may partially improve the degree of integration thereof while maintaining a higher reliability of the optical signal. That is, at least one second optical transmission line 210-1 bears a part of the optical signal transmission volume of the first optical transmission line 210 while transmitting a high reliability optical signal, thereby improving the degree of integration of the photonic integrated circuit 6 without sacrifice of the reliability in transmitting the optical signal.

Although an optical signal has been described as being divided between the first optical transmission line 210 and the second optical transmission line 210-1, in other embodiments, the first optical transmission line 210 and the second optical transmission line 210-1 may be configured to transmit different optical signals.

A photonic integrated circuit according to a seventh embodiment will now be explained with reference to FIG. 9. Explanations of the parts similar to the parts of the first to sixth embodiments will be omitted or brief.

Figure 9:
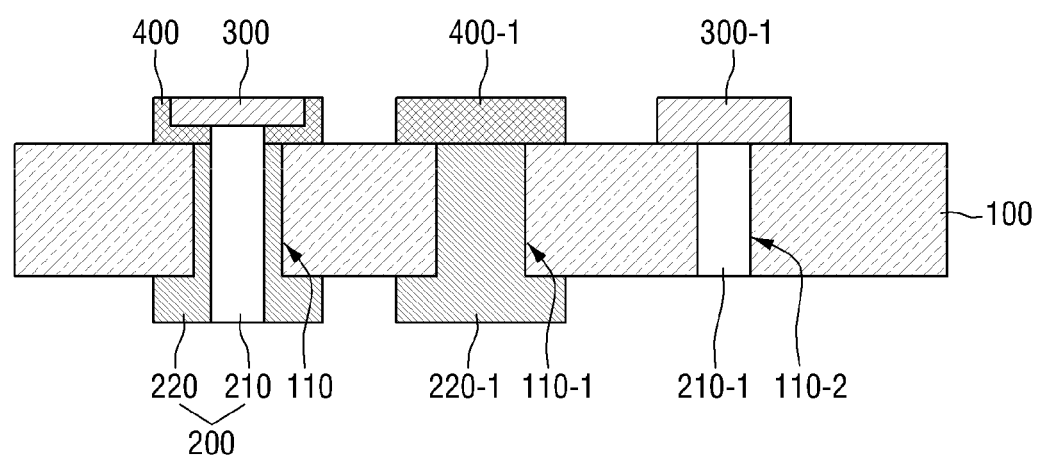
FIG. 9 is a cross-sectional view for describing a photonic integrated circuit according to a seventh embodiment.

FIG. 9 is a cross-sectional view for describing the photonic integrated circuit according to the seventh embodiment.

Referring to FIG. 9, a photonic integrated circuit 7 according to the seventh embodiment may include the first through hole 110, the first optical transmission line 210 and the first converter 300 similar to the first through hole 110, the optical transmission line 210 and the converter 300 of FIG. 1. The photonic integrated circuit 7 may further include the second through hole 110-1, the electrical transmission wire 220-1 and the second electrical terminal 400-1 of FIG. 7 and the third through hole 110-2, the second optical transmission line 210-1 and the second converter 300-1 of FIG. 8.

Thus, the photonic integrated circuit 7 may fully perform the function of transmitting an electrical signal or supplying power, and may partially improve the degree of integration thereof while maintaining a higher reliability of the optical signal.

A photonic integrated circuit according to an eighth embodiment will now be explained with reference to FIGS. 10 to 12. Explanations of the parts similar to the parts of the first to seventh embodiments will be omitted or brief.

Figure 10:
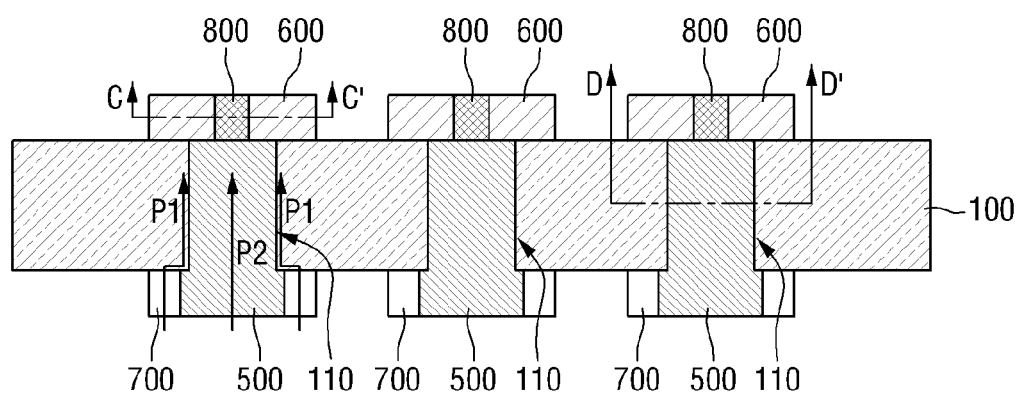
FIG. 10 is a cross-sectional view for describing a photonic integrated circuit according to an eighth embodiment.
Figure 11:
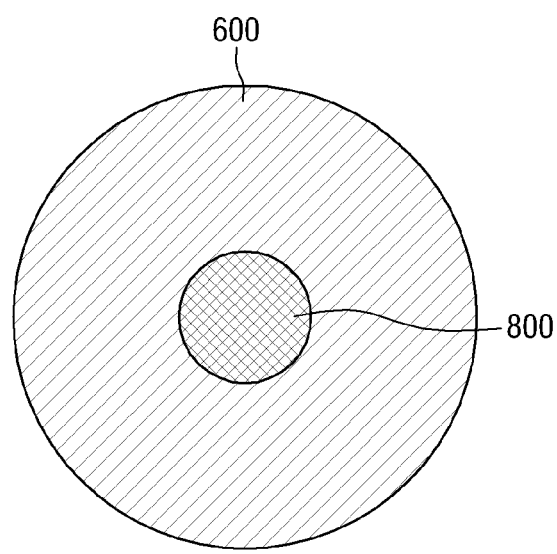
FIG. 11 is a top view taken along the line C-C' of FIG. 10.

FIG. 10 is a cross-sectional view for describing the photonic integrated circuit according to the eighth embodiment, and FIG. 11 is a top view taken along the line C-C' of FIG. 10. FIG. 12 is a cross-sectional view taken along the line D-D' of FIG. 10.

Referring to FIG. 10, a photonic integrated circuit 8 according to the eighth embodiment may include a metal transmission wire 500, an SPR generator 700, a converter 600 and an electrical terminal 800.

The transmission wire 500 may pass through the through hole 110. Thus, the transmission wires 500 may pass through the respective through holes 110 in a one-to-one correspondence. That is, the transmission wires 500 may correspond one-to-one with the through holes 110.

The transmission wire 500 may be configured to transmit a first electrical signal and an optical signal. The transmission wire 500 may be configured to provide both a path for transmitting the first electrical signal and a path for transmitting the optical signal. The transmission wire 500 may include both a region for entry of the optical signal (a region corresponding to P1) and a region for entry of the first electrical signal (a region corresponding to P2) at the second surface (the lower surface in the drawing) of the substrate 100.

The transmission wire 500 may include metal. Since the transmission wire 500 is a conductor, the transmission wire 500 may be configured to transmit the first electrical signal. The first electrical signal may be transmitted through a second path P2 of FIG. 10.

Figure 12:
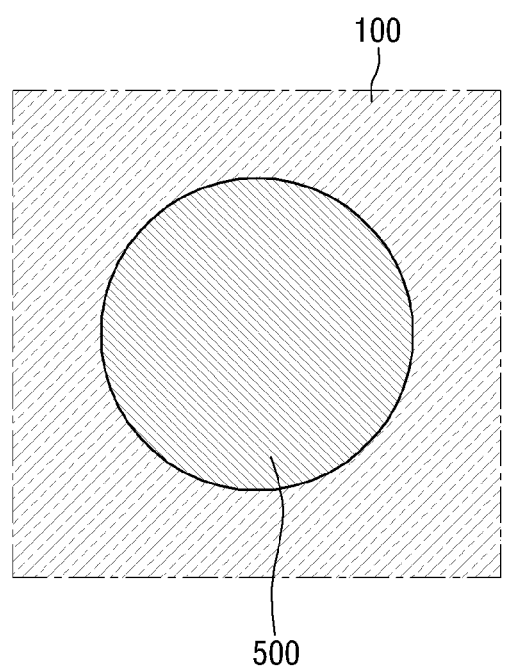
FIG. 12 is a cross-sectional view taken along the line D-D' of FIG. 10.

Referring to FIG. 12, the transmission wire 500 may be formed as a single film. That is, the transmission wire 500 may have a surface and an interior which are formed of the same material. The surface and the interior of the transmission wire 500 may be formed integrally with each other through a single process.

Referring back to FIG. 10, the transmission wire 500 may have a metallic surface, and an optical signal may be transmitted along the metallic surface. That is, the optical signal may be transmitted along the first path P1 of FIG. 10. The optical signal may be transmitted using a surface plasmon resonance (SPR). The surface plasmon resonance is a phenomenon in that surface waves are produced at a surface of metal when a light component such as laser beam and the like is applied to the surface of the metal at an angle equal to or bigger than a critical angle, and free electrons collectively move in the metal along the electromagnetic waves at the surface of the metal. The optical signal may be transmitted from one end to the other end of the transmission wire 500 through such a surface plasmon resonance phenomenon.

The SPR generator 700 may surround an outer surface of the transmission wire 500 on the second surface of the substrate 100. The SPR generator 700 may cover a part of the surface of the transmission wire 500. The SPR generator 700 may be formed of a semi-transparent material through which an optical signal may be transmitted and refracted. However, other embodiments are not limited thereto.

The SPR generator 700 may be configured to refract the optical signal such that the optical signal is radiated onto the surface of the transmission wire 500 at a predetermined angle and travels along the surface of the transmission wire 500. The SPR generator 700 may include, for example, a microlens. However, embodiments are not limited thereto, and the SPR generator 700 may include other devices such as a prism for enabling the optical signal to be incident at a predetermined angle.

The converter 600 may be configured to convert an optical signal from light into an electrical signal. For example, the converter 600 may include a photodiode or a photo transistor. That is, the converter 600 may take an optical signal as an input and derive an electrical signal as an output.

The converter 600 may be connected directly to the transmission wire 500. That is, the transmission wire 500 may be formed to directly contact the lower surface of the converter 600. The converter 600 may be configured to receive the optical signal from the surface of the transmission wire 500, convert the optical signal into the second electrical signal and output the second electrical signal. The second electrical signal may be used in other parts of the photonic integrated circuit.

The electrical terminal 800 may be connected to the transmission wire 500. The electrical terminal 800 may be configured to receive the first electrical signal transmitted through the transmission wire 500. As described above, the transmission of the first electrical signal may be used to supply power. Thus, the electrical terminal 800 may be a terminal for receiving power.

Referring to FIG. 11, the converter 600 may surround an outer surface of the electrical terminal 800. Thus, the surface of the transmission wire 500 may contact the converter 600, and a part of the cross section of the transmission wire 500 may contact the electrical terminal 800, thereby enabling the converter 600 and the electrical terminal 800 to receive the optical signal and the first electrical signal, respectively. Although the converter 600 and the electrical terminal 800 are depicted as having a circular outer surface in FIG. 11, it is a merely an illustrative example, and other embodiments are not limited thereto. That is, the converter 600 and the electrical terminal 800 may have other shapes such as a polygonal shape.

The photonic integrated circuit 8 according to the eighth embodiment may have through holes 110 and transmission wires 500 in a one-to-one correspondence and may be configured to simultaneously transmit an optical signal and an electrical signal. Thus, the degree of integration of the photonic integrated circuit 8 may be significantly improved. In addition, the number of the through holes 110 formed may be reduced to achieve improved efficiency of process.

A photonic integrated circuit according to a ninth embodiment will now be explained with reference to FIG. 13. Explanations of the parts similar to the parts of the first to eighth embodiments will be omitted or brief.

Figure 13:
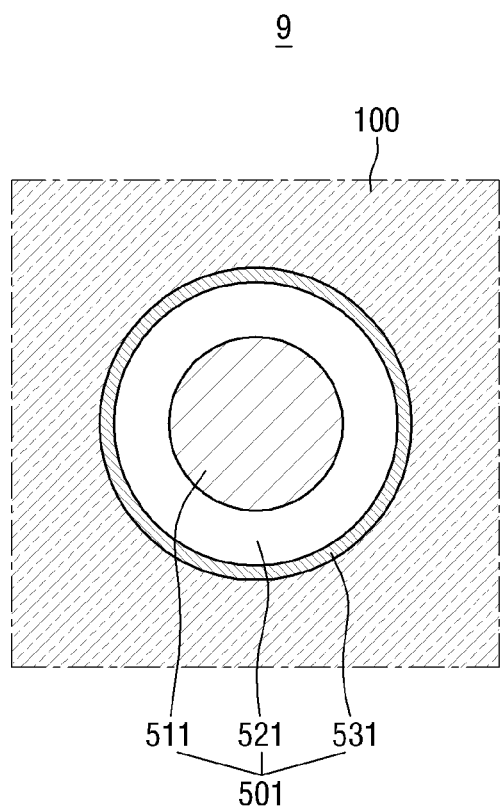
FIG. 13 is a cross-sectional view for describing a photonic integrated circuit according to a ninth embodiment.

FIG. 13 is a cross-sectional view for describing the photonic integrated circuit according to the ninth embodiment. FIG. 13 is a cross-sectional view corresponding to FIG. 12.

Referring to FIG. 13, a photonic integrated circuit 9 according to the ninth embodiment may have a transmission wire 501 including an internal wire 511, an intermediate insulation layer 521 and a surface metal layer 531.

The internal wire 511 may be a wire for transmitting the first electrical signal. The internal wire 511 may be in contact with the electrical terminal 800 so as to transmit the first electrical signal. The internal wire 511 may include a conductor for transmitting an electrical signal. The internal wire 511 may be electrically insulated from the surface metal layer 531.

The intermediate insulation layer 521 may be formed between the inner wire 511 and the surface metal layer 531. The intermediate insulation layer 521 may electrically insulate the inner wire 511 and the surface metal layer 531 from each other. The intermediate insulation layer 521 may completely surround an outer surface of the inner wire 511. The intermediate insulation layer 521 in a predetermined thickness may surround the outer surface of the inner wire 511.

The surface metal layer 531 may surround an outer surface of the intermediate insulation layer 521. The surface metal layer 531 may include metal and thus may have conductivity. The surface metal layer 531 may have a thickness thinner than the thickness of the intermediate insulation layer 521. The thickness of the surface metal layer 531 may be thinner than the diameter of the inner wire 511. However, other embodiments are not limited thereto.

The surface metal layer 531 may become a path for transmission of an optical signal according to a surface plasmon resonance phenomenon. Thus, a path for transmission of the optical signal and a path for transmission of the first electrical signal may be separated from each other by the intermediate insulation layer 521.

The photonic integrated circuit 9 according to the ninth embodiment may separate a path for transmission of the optical signal and a path for transmission of the first electrical signal from each other, thereby minimizing interference between the two signals. That is, since the optical signal and the first electrical signal may move in the same transmission wire 500, the two signals may affect each other and thus the reliability of the signals may be degraded. Therefore, the photonic integrated circuit 9 may improve reliability thereof by reducing a chance of or preventing the two signals from affecting each other.

A photonic integrated circuit according to a tenth embodiment will now be explained with reference to FIG. 14. Explanations of the parts similar to the parts of the first to ninth embodiments will be omitted or brief.

Figure 14:
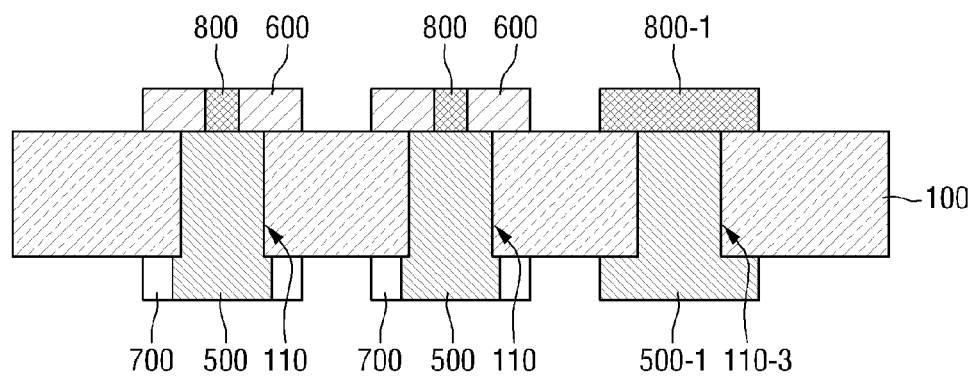
FIG. 14 is a cross-sectional view for describing a photonic integrated circuit according to a tenth embodiment.

FIG. 14 is a cross-sectional view for describing the photonic integrated circuit according to the tenth embodiment.

Referring to FIG. 14, a photonic integrated circuit 10 according to the tenth embodiment may include the first through hole 110 and the first electrical terminal 800 similar to the through hole 110 and the electrical terminal 800 of FIG. 10. One or more of such structures may be present. The photonic integrated circuit 10 may further include a fourth through hole 110-3, a second transmission wire 500-1 and a second electrical terminal 800-1.

The fourth through hole 110-3 may interconnect the first surface and the second surface of the substrate 100 like the first through hole 110 of the substrate 100. The second transmission wire 500-1 may pass through the fourth through hole 110-3. The second transmission wire 500-1 may be configured to transmit an electrical signal. The second electrical terminal 800-1 may be connected to the second transmission wire 500-1. The second electrical terminal 800-1 may be configured to receive the electrical signal transmitted through the second transmission wire 500-1. The second electrical terminal 800-1 may be a terminal for receiving power when the second transmission wire 500-1 supplies power.

The photonic integrated circuit 10 according to the tenth embodiment may transmit an electrical signal mainly through the second transmission wire 500-1, and may use the first transmission wire 500 in an auxiliary transmission of an electrical signal. That is, although the first transmission wire 500 may transmit both an optical signal and an electrical signal, the first transmission wire 500 alone may not transmit a sufficient amount of electrical signal, and thus the second transmission wire 500-1 may be arranged to transmit an electrical signal.

Thus, the photonic integrated circuit 10 may partially improve the degree of integration thereof while fully performing the function of transmitting an electrical signal or supplying power. That is, the electrical signal transmission volume of at least one second transmission wire 500-1 is shared with the first transmission wire 500, thereby improving the degree of integration without sacrifice of the reliability in transmitting the electrical signal.

A photonic integrated circuit according to an eleventh embodiment will now be explained with reference to FIGS. 15 and 16. Explanations of the parts similar to the parts of the first to tenth embodiments will be omitted or brief.

Figure 15:
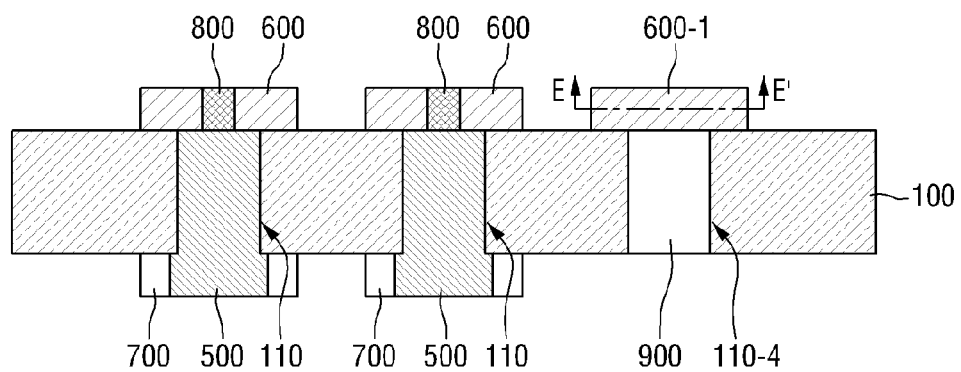
FIG. 15 is a cross-sectional view for describing a photonic integrated circuit according to an eleventh embodiment.
Figure 16:
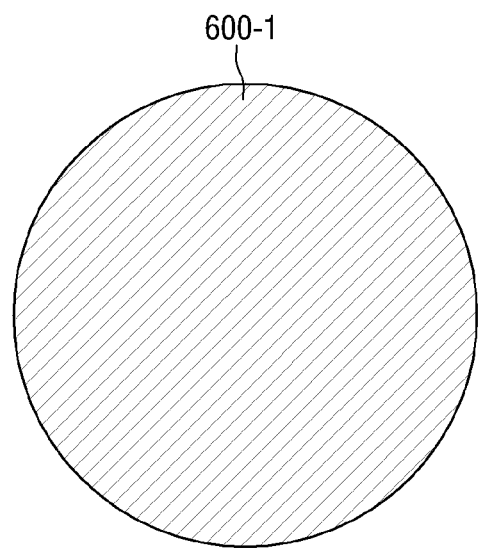
FIG. 16 is a top view taken along the line E-E' of FIG. 10.

FIG. 15 is a cross-sectional view for describing the photonic integrated circuit according to the eleventh embodiment, and FIG. 16 is a top view taken along the line E-E' of FIG. 10.

Referring to FIG. 15, a photonic integrated circuit 11 according to the eleventh embodiment may include the first through hole 110 and the first converter 600 similar to the through hole 110 and the converter 600 of FIG. 10. The photonic integrated circuit 11 may further include a fifth through hole 110-4, an optical transmission line 900 and a second converter 600-1.

The fifth through hole 110-4 may interconnect the first surface and the second surface of the substrate 100 like the first through hole 110 of the substrate 100. The optical transmission line 900 may transmit an optical signal. The optical transmission line 900 may include optical fiber.

The second converter 600-1 may be connected to the optical transmission line 900. The second converter 600-1 may be configured to receive the optical signal transmitted through the optical transmission line 900. The second converter 600-1 may be configured to convert the optical signal into an electrical signal.

Referring to FIG. 16, since the second converter 600-1 is connected to the optical transmission line 900 alone, the second converter 600-1 may not contact other elements such as the electrical terminal 800. That is, the second converter 600-1 may be formed into an integral body as shown in the drawing. Although the second converter 600-1 is depicted as having a circular shape in FIG. 16, other embodiments are not limited thereto.

Referring back to FIG. 15, the photonic integrated circuit 11 according to the eleventh embodiment may be configured to transmit an optical signal separately through the transmission wire 500 and the optical transmission line 900. That is, although the transmission wire 500 may transmit both an optical signal and an electrical signal, the reliability of the optical signal may be degraded when using the transmission wire 500 alone, and thus the optical transmission line 900 may be used for an additional transmission of an optical signal. Specifically, the transmission wire 500 may be configured to transmit an optical signal by a surface plasmon resonance, which may have lower reliability of optical signal transmission than a direct transmission of optical signal using optical fiber. Thus, to supplement the reliability of optical signal transmission, the additional optical transmission line 900 may be formed to pass through the fifth through hole 110-4.

Thus, the photonic integrated circuit 11 may partially improve the degree of integration thereof while maintaining the higher reliability of the optical signal. That is, at least one optical transmission line 900 may be configured to bear a part of the optical signal transmission volume of the transmission wire 500 while transmitting a higher reliability optical signal, thereby improving the degree of integration of the photonic integrated circuit 11 without sacrifice of the reliability in transmitting the optical signal.

A photonic integrated circuit according to a twelfth embodiment will now be explained with reference to FIG. 17. Explanations of the parts similar to the parts of the first to eleventh embodiments will be omitted or brief.

Figure 17:
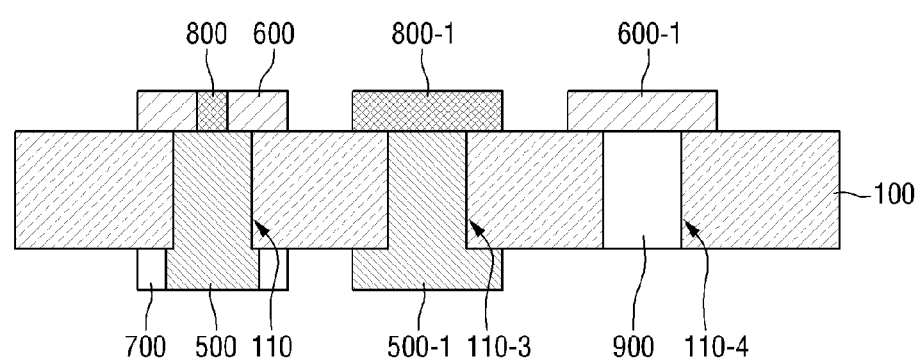
FIG. 17 is a cross-sectional view for describing a photonic integrated circuit according to a twelfth embodiment.

FIG. 17 is a cross-sectional view for describing the photonic integrated circuit according to the twelfth embodiment.

Referring to FIG. 17, a photonic integrated circuit 12 according to the twelfth embodiment may include the first through hole 110, the first electrical terminal 800 and the first converter 600 similar to the through hole 110, the electrical terminal 800 and the converter 600 of FIG. 10. The photonic integrated circuit 12 may further include the fourth through hole 110-3, the second transmission wire 500-1 and the second electrical terminal 800-1 of FIG. 14 and the fifth through hole 110-4, the optical transmission line 900 and the second converter 600-1 of FIG. 15.

Thus, the photonic integrated circuit 12 may partially improve the degree of integration thereof while fully performing the function of transmitting an electrical signal or supplying power and maintaining higher reliability of an optical signal.

A photonic integrated circuit according to a thirteenth embodiment will now be explained with reference to FIGS. 14 and 18. Explanations of the parts similar to the parts of the first to twelfth embodiments will be omitted or brief.

Figure 18:
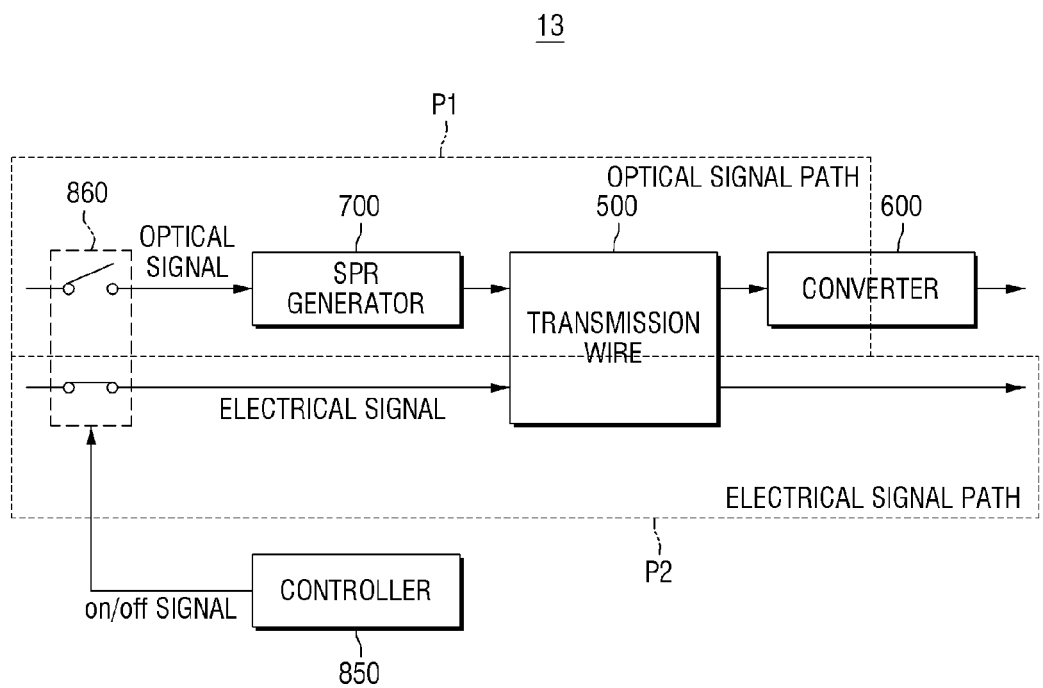
FIG. 18 is a block diagram for describing a photonic integrated circuit according to a thirteenth embodiment.

FIG. 18 is a block diagram for describing the photonic integrated circuit according to the thirteenth embodiment.

Referring to FIGS. 14 to 18, a photonic integrated circuit 13 according to the thirteenth embodiment may further include a controller 850. The controller 850 may be configured to provide an on/off control for the optical signal path P1 and the electrical signal path P2.

Specifically, like the photonic integrated circuit 9 of the ninth embodiment, the photonic integrated circuit 13 may have, in the single transmission wire 500, both the optical signal path P1 serving as a path for transmitting the optical signal and the electrical signal path P2 serving as a path for transmitting the first electrical signal. In this case, the optical signal path P1 and the electrical signal path P2 may not simply mean a path in the transmission wire 500 but may mean a path including both the SPR generator 700 and the converter 600.

The first electrical signal may be transmitted through an interior of the transmission wire 500 and the optical signal may be transmitted through the surface of the transmission wire 500. The interior and the surface of the transmission wire 500 are formed integrally to transmit both the first electrical signal and the optical signal. In this case, the first electrical signal and the optical signal may be interfered with each other, thus degrading reliability of each signal.

Therefore, the controller 850 may be configured to separate an application of the first electrical signal and the optical signal in terms of time, thereby improving reliability of each signal. Specifically, the controller 850 may be configured to apply an on/off signal to a switch 860 such that the first electrical signal may not be applied while the optical signal is being applied, and on the contrary, may apply an on/off signal such that the first electrical signal may be applied while no optical signal is being applied.

In an embodiment, the switch 860 may be a combined electrical switch and optical switch configured such that the electrical switch is open when the optical switch is closed, and vice versa. The switch 860 may be configured to respond to the on/off signal from the controller 850. Thus, the switch 860 may be configured to alternately pass an electrical signal to the electrical transmission structure of the transmission wire 500 or pass an input optical signal to the SPR generator 700 in response to a control signal from the controller 850.

In the tenth to twelfth embodiments, a path for additionally transmitting an optical signal and/or an electrical signal is arranged to enable the controller 850 to serve in a more efficient manner.

A photonic integrated circuit according to a fourteenth embodiment will now be explained with reference to FIG. 19. Explanations of the parts similar to the parts of the first to thirteenth embodiments will be omitted or brief.

Figure 19:
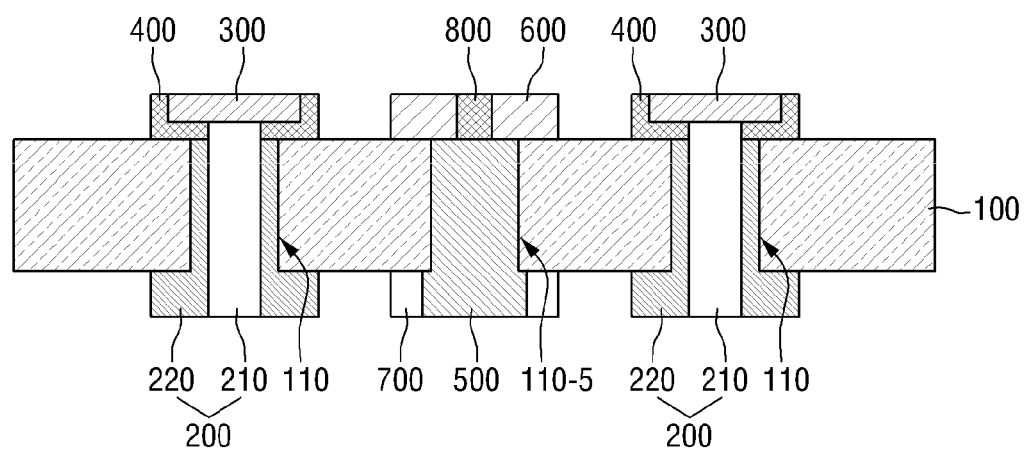
FIG. 19 is a cross-sectional view for describing a photonic integrated circuit according to a fourteenth embodiment.

FIG. 19 is a cross-sectional view for describing the photonic integrated circuit according to the fourteenth embodiment.

Referring to FIG. 19, a photonic integrated circuit 14 according to the fourteenth embodiment may be understood as an embodiment in which the photonic integrated circuit 1 according to the first embodiment and the photonic integrated circuit 8 according to the eighth embodiment are combined.

Specifically, the photonic integrated circuit 14 may include the first through hole 110, the first transmission wire 200, the first converter 300 and the first electrical terminal 400 similar to the through hole 110, the transmission wire 200, the converter 300 and the electrical terminal 400 of FIG. 1, respectively. Furthermore, the photonic integrated circuit 14 may include a sixth through hole 110-5, the second transmission wire 500, the SPR generator 700, the second converter 600 and the second electrical terminal 800 similar to the through hole 110, the transmission wire 500, the SPR generator 700, the converter 600 and the electrical terminal 800 of FIG. 10, respectively.

Since the optical transmission line 210 of the first transmission wire 200 includes optical fiber, the first transmission wire 200 may have high reliability in transmitting the optical signal and enable high speed communication. In comparison, the second transmission wire 500 simply uses only a metal wire in the through hole, thereby simplifying processes and reducing costs. Furthermore, a process margin for forming the through hole can be ensured larger, thereby improving the degree of integration.

Thus, in a single substrate, the first transmission wire 200 may be used in a region in which a stable signal is required, that is, reliability of a signal is considered as being more important, and the second transmission wire 500 may be used in a region in which the degree of integration is considered as being more important, thereby improving overall performance of the photonic integrated circuit 14.

Furthermore, in a photonic integrated circuit device using multiple substrates, the first transmission wire 200 and the second transmission wire 500 may be used in the respective substrates, thereby enabling the photonic integrated circuit device to have all merits different from each other.

A photonic integrated circuit according to a fifteenth embodiment will now be explained with reference to FIG. 20. Explanations of the parts similar to the parts of the first to fourteenth embodiments will be omitted or brief.

Figure 20:
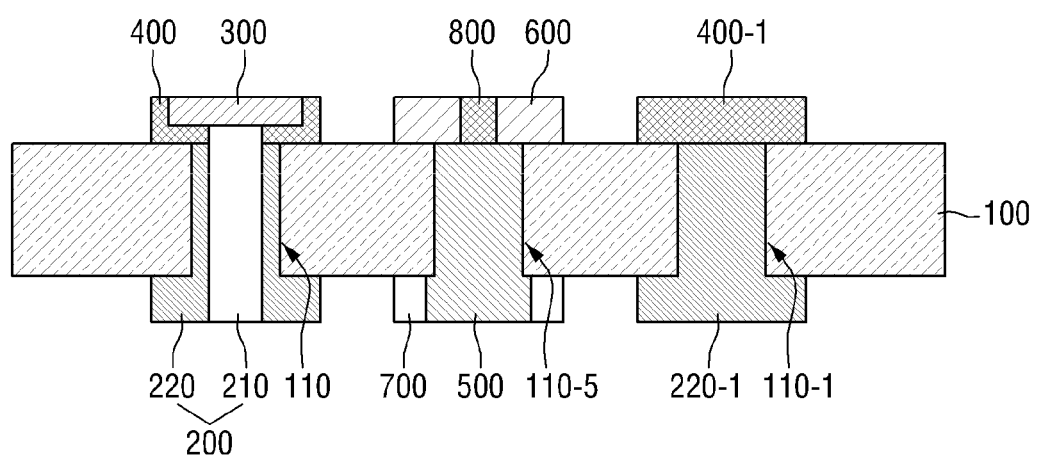
FIG. 20 is a cross-sectional view for describing a photonic integrated circuit according to a fifteenth embodiment.

FIG. 20 is a cross-sectional view for describing the photonic integrated circuit according to the fifteenth embodiment.

Referring to FIG. 20, a photonic integrated circuit 15 according to the fifteenth embodiment may include the second through hole 110-1, the electrical transmission wire 220-1 and the second electrical terminal 400-1 in addition to the components of the photonic integrated circuit 14 according to the fourteenth embodiment.

The second through hole 110-1 may interconnect the first surface and the second surface of the substrate 100 like the first through hole 110 of the substrate 100. The electrical transmission wire 220-1 may pass through the second through hole 110-1. The electrical transmission wire 220-1 may be configured to transmit an electrical signal. The second electrical terminal 400-1 may be connected to the electrical transmission wire 220-1. The second electrical terminal 400-1 may be configured to receive the electrical signal transmitted through the electrical transmission wire 220-1. The second electrical terminal 400-1 may be a terminal for receiving power when the electrical transmission wire 220-1 supplies power.

The photonic integrated circuit 15 according to the fifteenth embodiment may be configured to transmit an electrical signal mainly through the electrical transmission wire 220-1, and may use the first transmission wire 200 and the second transmission wire 500 in an auxiliary transmission of an electrical signal. That is, although the first transmission wire 200 and the second transmission wire 500 may transmit both an optical signal and an electrical signal, the first transmission wire 200 and the second transmission wire 500 alone may not transmit a sufficient amount of electrical signal, and thus the electrical transmission wire 220-1 may be arranged to transmit an electrical signal.

Thus, the photonic integrated circuit 15 may partially improve the degree of integration thereof while fully performing the function of transmitting an electrical signal or supplying power. That is, the electrical signal transmission volume of at least one electrical transmission wire 220-1 is shared with the transmission wire 200 and the second transmission wire 500, thereby improving the degree of integration and reducing or eliminating a potential of sacrifice of the reliability in transmitting the electrical signal.

A photonic integrated circuit according to a sixteenth embodiment will now be explained with reference to FIG. 21. Explanations of the parts similar to the parts of the first to fifteenth embodiments will be omitted or brief.

Figure 21:
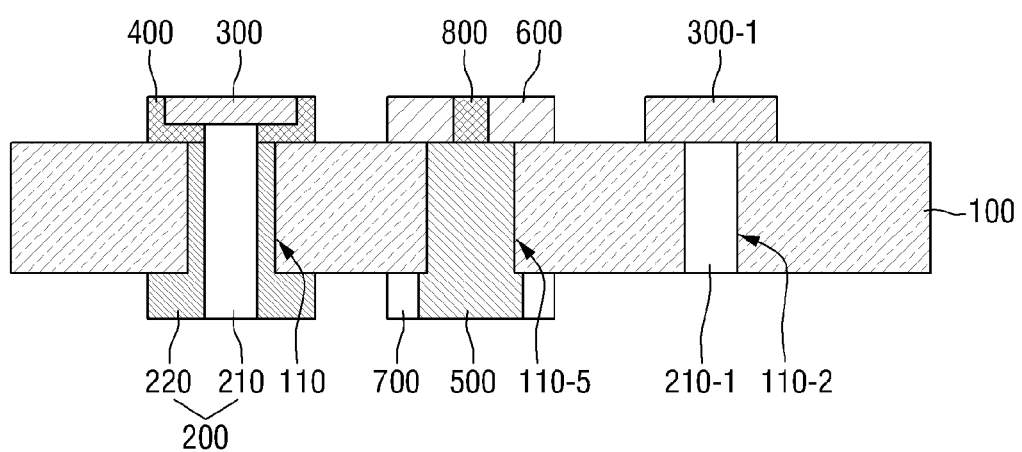
FIG. 21 is a cross-sectional view for describing a photonic integrated circuit according to a sixteenth embodiment.

FIG. 21 is a cross-sectional view for describing the photonic integrated circuit according to the sixteenth embodiment.

Referring to FIG. 21, the photonic integrated circuit 16 according to the sixteenth embodiment may include the first optical transmission line 210 similar to the optical transmission line 900 of the photonic integrated circuit 14 according to the fourteenth embodiment. The photonic integrated circuit 15 may further include the third through hole 110-2, the second optical transmission line 210-1 and the third converter 300-1 in addition to the components of the photonic integrated circuit 14.

The third through hole 110-2 may interconnect the first surface and the second surface of the substrate 100 like the first through hole 110 of the substrate 100. The second optical transmission line 210-1 may be configured to transmit an optical signal. The second optical transmission line 210-1 may include optical fiber.

The third converter 300-1 may be connected to the second optical transmission line 210-1. The third converter 300-1 may be configured to receive the optical signal transmitted through the second optical transmission line 210-1. The third converter 300-1 may be configured to convert the optical signal into an electrical signal.

Since the third converter 300-1 is connected to the second optical transmission line 210-1 alone, the third converter 300-1 may not contact other elements such as the electrical terminal 800. That is, the third converter 300-1 may be formed into an integral body as shown in the drawing. The photonic integrated circuit 16 according to the sixteenth embodiment may be configured to transmit an optical signal separately through the first transmission wire 200, the second transmission wire 500 and the second optical transmission line 210-1. That is, although the first transmission wire 200 and the second transmission wire 500 may be configured to transmit both an optical signal and an electrical signal, the reliability of the optical signal may be degraded when using the first transmission wire 200 and the second transmission wire 500 alone, and thus the second optical transmission line 210-1 may be arranged for an additional transmission of an optical signal. Specifically, the second transmission wire 500 may be configured to transmit an optical signal by a surface plasmon resonance, which may have lower reliability of optical signal transmission than a direct transmission of optical signal using optical fiber. Thus, to supplement the reliability of optical signal transmission, the additional second optical transmission line 210-1 may be formed to pass through the third through hole 110-2.

Thus, the photonic integrated circuit 11 may partially improve the degree of integration thereof while maintaining the higher reliability of the optical signal. That is, at least one second optical transmission line 210-1 may be configured to bear a part of the optical signal transmission volume of the first transmission wire 200 and the second transmission wire 500 while transmitting a higher reliability optical signal, thereby improving the degree of integration of the photonic integrated circuit 16 reducing or eliminating a chance of sacrifice of the reliability in transmitting the optical signal.

A photonic integrated circuit according to a seventeenth embodiment will now be explained with reference to FIG. 22. Explanations of the parts similar to the parts of the first to sixteenth embodiments will be omitted or brief.

Figure 22:
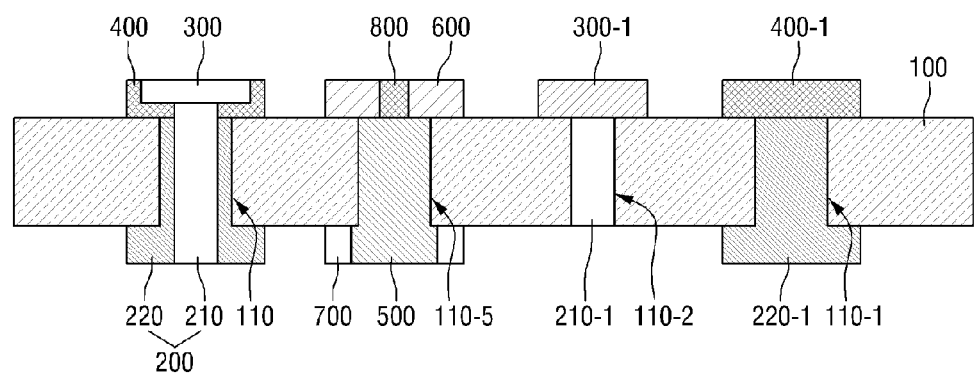
FIG. 22 is a cross-sectional view for describing a photonic integrated circuit according to a seventeenth embodiment.

FIG. 22 is a cross-sectional view for describing the photonic integrated circuit according to the seventeenth embodiment.

Referring to FIG. 22, a photonic integrated circuit 17 according to the seventeenth embodiment may include the first transmission wire 200 and the second transmission wire 500 of the photonic integrated circuit 14 of FIG. 19. The photonic integrated circuit 17 may further include the second through hole 110-1, the electrical transmission film 500 and the second electrical terminal 400-1 of the photonic integrated circuit 15 of FIG. 20 and the third through hole 110-2, the second optical transmission line 210-1 and the third converter 300-1 of FIG. 21.

Thus, the photonic integrated circuit 17 may be configured to partially improve the degree of integration thereof while fully performing the function of transmitting an electrical signal or supplying power and maintaining the higher reliability of the optical signal.

A photonic integrated circuit according to an eighteenth embodiment will now be explained with reference to FIG. 23. Explanations of the parts similar to the parts of the first to seventeenth embodiments will be omitted or brief.

Figure 23:
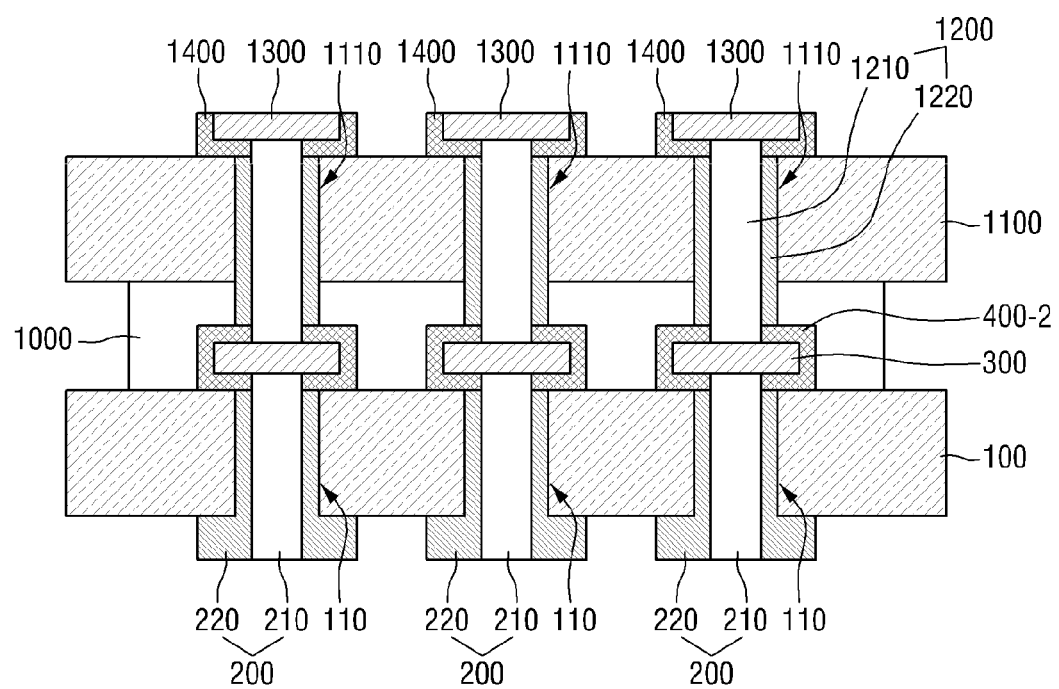
FIG. 23 is a cross-sectional view for describing a photonic integrated circuit according to an eighteenth embodiment.

FIG. 23 is a cross-sectional view for describing the photonic integrated circuit according to the eighteenth embodiment.

Referring to FIG. 23, a photonic integrated circuit 18 according to the eighteenth embodiment may include the first substrate 100, the first through hole 110, the first transmission wire 200, the first optical transmission line 210 and the first converter 300 similar to the substrate 100, the through hole 110, the transmission wire 200, the optical transmission line 210, the electrical transmission film 220 and the converter 300 of the first embodiment. The photonic integrated circuit 18 may further include a second substrate 1100, a seventh through hole 1110, a third transmission wire 1200, a third optical transmission line 1210, a second electrical transmission film 1220, a third electrical terminal 400-2, a fourth electrical terminal 1400, a fourth converter 1300 and a mold layer 1000.

The second substrate 1100 may be stacked on the first substrate 100. Specifically, the second substrate 1100 may be stacked on the mold layer 1000 on the first substrate 100. The second substrate 1100 may be similar to the first substrate 100, but may be different in other embodiments. The second substrate 1100 may include the seventh through hole 1110. The seventh through hole 1110 may be overlapped with the first through hole 110 in a vertical direction.

The third transmission wire 1200 may pass through the seventh through hole 1110. The third transmission wire 1200 may be configured to transmit an optical signal and an electrical signal like the first transmission wire 200. The third transmission wire 1200 may include the third optical transmission line 1210 and the second electrical transmission film 1220. The third optical transmission line 1210 may perform a function basically similar to the function of the first optical transmission line 210. The first converter 300 may convert only a part of the optical transmission signal transmitted through the first optical transmission line 210 into an electrical signal, and transmit the rest of the optical transmission signal to the third optical transmission line 1210. However, other embodiments are not limited thereto.

The second electrical transmission film 1220 may surround the third optical transmission line 1210. The second electrical transmission film 1220 may be a conductor that transmits an electrical signal. The second electrical transmission film 1220 may perform a function similar to that of the first electrical transmission film 220. The second electrical transmission film 1220 may be electrically connected to the third electrical terminal 400-2 and the fourth electrical terminal 1400.

The third electrical terminal 400-2 may surround a part of the outer surface of the first converter 300. Unlike the photonic integrated circuit 1 according to the first embodiment, the third electrical terminal 400-2 of the photonic integrated circuit 18 according to the eighteenth embodiment may cover an upper surface of the first converter 300 as well as the lower and side surfaces of the first converter 300. This may enable the third electrical terminal 400-2 to be easily electrically connected to the third transmission wire 1200. However, other embodiments are not limited thereto. The third electrical terminal 400-2 may be electrically connected to the first electrical transmission film 220 and the second electrical transmission film 1220.

The fourth electrical terminal 1400 may be disposed on the second substrate 1100. The fourth electrical terminal 1400 may be electrically connected to the second electrical transmission film 1220 of the third transmission wire 1200. The fourth electrical terminal 1400 may be configured to receive the electrical signal transmitted through the second electrical transmission film 1220.

The fourth converter 1300 may be disposed on the second substrate 1100. The fourth converter 1300 may be connected directly to the third optical transmission line 1210 of the third transmission wire 1200. The fourth converter 1300 may be configured to receive the optical signal transmitted through the third optical transmission line 1210.

The mold layer 1000 may be formed between the first substrate 100 and the second substrate 1100. The mold layer 1000 may support the second substrate 1100. Furthermore, the mold layer 1000 may be formed on an element on the first substrate 100, that is, on the first converter 300 and the third electrical terminal 400-2, so as to protect the first converter 300, the third electrical terminal 400-2, the third transmission wire 1200, and the like from external stimulus.

Although the photonic integrated circuit 18 according to the eighteenth embodiment is depicted as including two substrates, other embodiments are not limited thereto. The photonic integrated circuit 18 may achieve a higher degree of integration thereof by using transmission wires for simultaneously transmitting an optical signal and an electrical signal in a through substrate via (TSV) structure for improving the degree of integration.

A photonic integrated circuit according to a nineteenth embodiment will now be explained with reference to FIG. 24. Explanations of the parts similar to the parts of the first to eighteenth embodiments will be omitted or brief.

Figure 24:
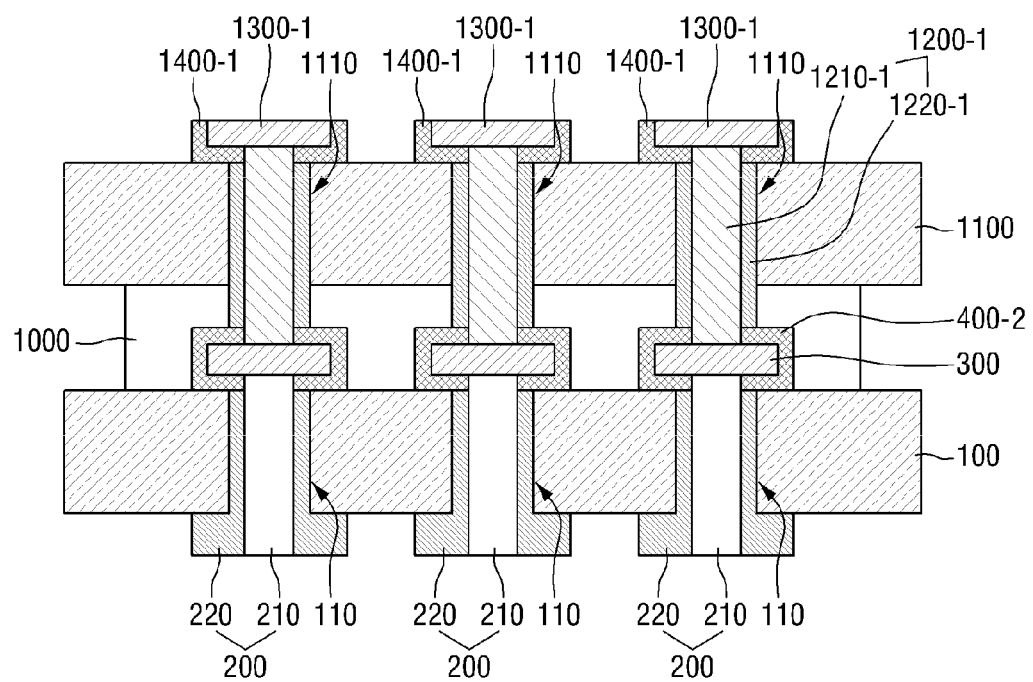
FIG. 24 is a cross-sectional view for describing a photonic integrated circuit according to a nineteenth embodiment.

FIG. 24 is a cross-sectional view for describing the photonic integrated circuit according to the nineteenth embodiment.

Referring to FIG. 24, a photonic integrated circuit 19 according to the nineteenth embodiment is identical with the photonic integrated circuit 18 according to the eighteenth embodiment except that the photonic integrated circuit 19 includes a fourth transmission wire 1200-1, a fifth electrical terminal 1400-1 and a fifth converter 1300-1.

The fourth transmission wire 1200-1 may be configured to transmit two forms of electrical signals. That is, the fourth transmission wire 1200-1 may be configured to transmit a first electrical signal and a second electrical signal. The fourth transmission wire 1200-1 may include a first electrical signal wire 1220-1 and a second electrical signal wire 1210-1.

The first electrical signal wire 1220-1 may be connected to the third electrical terminal 400-2. The first electrical signal wire 1220-1 may be configured to transmit the first electrical signal via the third electrical terminal 400-2. The transmission of the first electrical signal may be supply of power.

The second electrical signal wire 1210-1 may be connected directly to the first converter 300. The second electrical signal wire 1210-1 may be configured to transmit the second electrical signal corresponding to the optical signal received at the first converter 300. That is, the first converter 300 may receive the optical signal and convert the optical signal into a second electrical signal, and thus-obtained second electrical signal may be transmitted through the second electrical signal wire 1210-1. Although not shown in the drawings, an insulation layer may be further interposed between the first electrical signal wire 1220-1 and the second electrical signal wire 1210-1 so as to separate the first electrical signal wire 1220-1 and the second electrical signal wire 1210-1.

The photonic integrated circuit 19 according to the nineteenth embodiment may have a structure in which multiple layers, that is, multiple substrates are stacked and a first layer receives both an optical signal and an electrical signal, thereby achieving a higher degree of integration. Then, since the optical signal has been converted into an electrical signal, a second layer, that is, the second substrate 1100 may include a wire for transmitting the electrical signal, thereby improving efficiency of interlayer communication.

A photonic integrated circuit according to a twentieth embodiment will now be explained with reference to FIG. 25. Explanations of the parts similar to the parts of the first to nineteenth embodiments will be omitted or brief.

Figure 25:
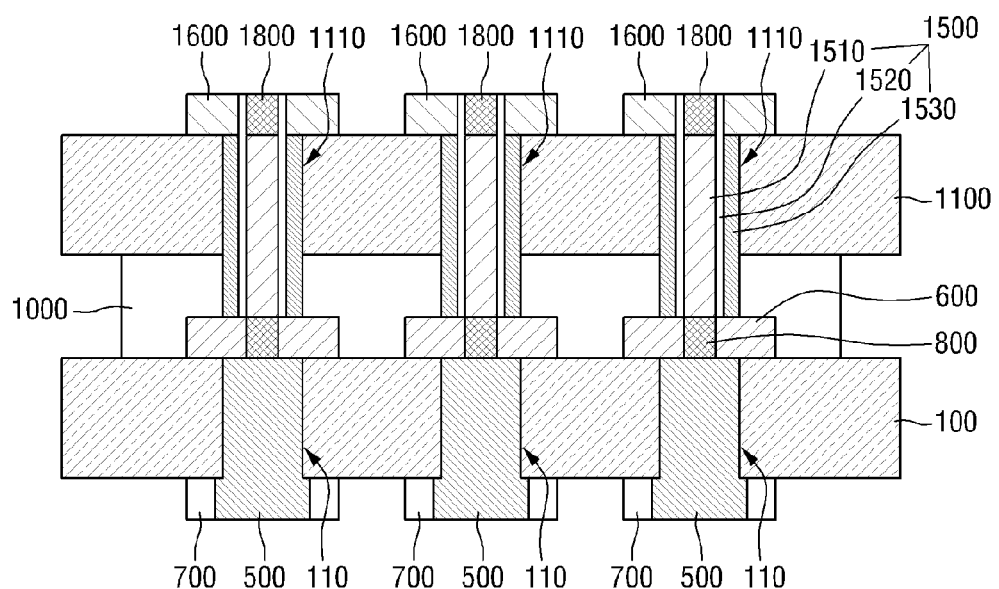
FIG. 25 is a cross-sectional view for describing a photonic integrated circuit according to a twentieth embodiment.

FIG. 25 is a cross-sectional view for describing the photonic integrated circuit according to the twentieth embodiment.

Referring to FIG. 25, a photonic integrated circuit 20 according to the twentieth embodiment may include the first transmission wire 500, the first converter 600, the SPR generator 700 and the first electrical terminal 800 similar to the transmission wire 500, the converter 600, the SPR generator 700 and the electrical terminal 800 of the photonic integrated circuit 8 according to the eighth embodiment, respectively, in place of the first transmission wire 200, the first converter 300 and the third electrical terminal 400-2 of the photonic integrated circuit 19 according to the nineteenth embodiment. The photonic integrated circuit 20 may further include a second transmission wire 1500, a first signal receiving terminal 1800 and a second signal receiving terminal 1600.

The second transmission wire 1500 may include an internal electrical wire 1510, an external electrical wire 1530 and an isolation film 1520. The internal electrical wire 1510 may be electrically connected to the first electrical terminal 800. The internal electrical wire 1510 may be electrically connected to the first signal receiving terminal 1800. The internal electrical wire 1510 may be configured to transmit the first electrical signal transmitted along the first transmission wire 500.

The external electrical wire 1530 may be electrically connected to the first converter 600 and the second signal receiving terminal 1600. The first converter 600 may be configured to convert the optical signal transmitted along the surface of the first transmission wire 500 into a second electrical signal, and the external electrical wire 1530 may transmit the second electrical signal to the second signal receiving terminal 1600.

The isolation film 1520 may be interposed between the internal electrical wire 1510 and the external electrical wire 1530 so as to perform electrical insulation between the internal electrical wire 1510 and the external electrical wire 1530. If the first electrical signal is transmitted to perform supply of power, the first signal receiving terminal 1800 may serve as a power terminal.

The photonic integrated circuit 20 according to the twentieth embodiment may have a structure in which multiple layers, that is, multiple substrates are stacked and a first layer receives both an optical signal and an electrical signal, thereby achieving a higher degree of integration. Then, since the optical signal has been converted into an electrical signal, a second layer, that is, the second substrate 1100 may include a wire for transmitting the electrical signal, thereby improving efficiency of interlayer communication.

An embodiment includes a photonic integrated circuit having an improved degree of integration.

However, embodiments are not restricted to those set forth herein. The other embodiments which are not mentioned herein will become more apparent to a person skilled in the art by referencing the detailed description given below.

An embodiment includes a photonic integrated circuit comprising a substrate having a through hole interconnecting a first surface and a second surface, a transmission wire which passes through the through hole and transmits a first electrical signal and an optical signal, a converter which is connected to the transmission wire on the first surface and which converts the optical signal into a second electrical signal and an electrical terminal which is connected to the transmission wire on the second surface and which receives the first electrical signal.

In some embodiments, the transmission wire includes a first region on the second surface in which the first electrical signal is input and a second region on the second surface in which the optical signal is input.

In some embodiments, the transmission wire includes an optical transmission line which is connected to the converter and which transmits the optical signal, and an electrical transmission film which is connected to the electrical terminal to transmit the first electrical signal and which surrounds an outer surface of the optical transmission line.

In some embodiments, an upper surface of the electrical transmission film includes a first point and a second point, wherein a first distance between the upper surface at the first point and the optical transmission line is identical with a second distance between the upper surface at the second point and the optical transmission line.

In some embodiments, the optical transmission line includes optical fiber for guiding the optical signal, wherein the transmission wire further includes a reflective layer interposed between the transmission wire and the optical fiber so as to reflect the optical signal.

In some embodiments, the electrical terminal is formed to cover a part of an outer surface of the converter, wherein the optical transmission line is connected directly to the converter.

In some embodiments, the electrical transmission film includes multiple sub electrical transmission films electrically insulated from each other, and an insulation film formed between the sub electrical transmission films.

In some embodiments, the transmission wire includes metal, wherein the photonic integrated circuit further comprises a surface plasmon resonance (SPR) generator arranged on a surface of the transmission wire so as to transmit the optical signal to the converter by a surface plasmon resonance.

In some embodiments, the SPR generator surrounds the transmission wire on the second surface.

In some embodiments, the SPR generator includes a microlens for refracting, at a predetermined angle, the optical signal to the surface of the transmission wire.

In some embodiments, the photonic integrated circuit may further comprise a controller for separating the first electrical signal and the optical signal in terms of time and applying the first electrical signal and the optical signal separated from each other to the transmission wire.

In some embodiments, the transmission wire includes an internal wire which transmits the first electrical signal, an intermediate insulation layer which surrounds the internal wire, and a surface metal layer which surround the intermediate insulation layer and transmits the optical signal.

In some embodiments, the converter includes a photo diode or a photo transistor.

In some embodiments, the through hole includes first and second through holes, wherein the transmission wire includes first and second transmission wires passing through the first and second through holes, respectively, wherein the electrical terminal includes first and second electrical terminals connected to the first and second transmission wires, respectively, wherein the first electrical terminal receives power through the first transmission wire, wherein the second electrical terminal is grounded through the second transmission wire.

An embodiment includes a photonic integrated circuit comprising a substrate having a first through hole and a second through hole interconnecting a first surface and a second surface, a first transmission wire and a second transmission wire which perform supply of power and transmission of an optical signal, and which pass through the first through hole and the second through hole, respectively, a first converter and a second converter which are connected to the first transmission wire and the second transmission wire, respectively, on the first surface, and which convert the optical signal into an electrical signal, a first electrical terminal and a second electrical terminal connected to the first transmission wire and the second transmission wire on the first surface and a surface plasmon resonance (SPR) generator which is arranged on the second surface and which irradiates, at a predetermined angle, the optical signal onto a surface of the second transmission wire so as to transmit the optical signal to the second converter by a surface plasmon resonance, wherein the first transmission wire includes an optical transmission line which is connected to the first converter and which transmits the optical signal, and an electrical transmission film which is connected to the first electrical terminal and which surrounds an outer surface of the optical transmission line.

In some embodiments, the substrate further has a third through hole, wherein the photonic integrated circuit further comprises a third transmission wire which passes through the third through hole and which supplies power, and a third electrical terminal connected to the third transmission wire on the substrate.

In some embodiments, the substrate further has a fourth through hole, wherein the photonic integrated circuit further comprises a fourth transmission wire which passes through the fourth through hole and which transmits an optical signal, and a third converter connected to the fourth transmission wire on the substrate.

An embodiment includes a photonic integrated circuit comprising a first substrate having a first through substrate via (TSV), a second substrate which has a second TSV overlapped with the first TSV in a vertical direction, and which is stacked on the first substrate, a first transmission wire which passes through the first TSV and transmits a first signal that is an optical signal and supplies power, a second transmission wire which passes through the second TSV and transmits a second signal and/or supplies power, a first converter which converts the first signal into an electrical signal, and which is connected to the first and second transmission wires, respectively, between the first and second substrates, a first electrical terminal connected to the first and second transmission wires, respectively, between the first and second substrates and a second electrical terminal connected to the second transmission wire on the second substrate.

In some embodiments, the second signal is an optical signal, wherein the photonic integrated circuit further comprises a second converter which is arranged on the second substrate and which converts the second signal into an electrical signal.

In some embodiments, the second signal is an electrical signal, wherein the second electrical terminal includes a signal receiving terminal for receiving the second signal, and a power terminal for receiving power.

While embodiments have been particularly shown and described with reference to particular embodiments thereof, it will be understood by those of ordinary skill in the art that various changes in form and details may be made therein without departing from the spirit and scope as defined by the following claims. It is therefore desired that the present embodiments be considered in all respects as illustrative and not restrictive, reference being made to the appended claims rather than the foregoing description to indicate the scope.

What is claimed is:

1. A photonic integrated circuit comprising:
   a substrate having a through hole interconnecting a first surface and a second surface;
   a transmission wire passing through the through hole and including an optical transmission structure and an electrical transmission structure; and
   an optical-to-electrical converter connected to the optical transmission structure of the transmission wire on the first surface;
   wherein:
      the electrical transmission structure comprises an electrical terminal at the second surface configured to receive a first electrical signal; and
      the optical transmission structure is configured to receive an optical signal at the second surface.

2. The photonic integrated circuit of claim 1, wherein the optical transmission structure extends from the first surface to the second surface within the electrical transmission structure.

3. The photonic integrated circuit of claim 2, wherein:
   the optical transmission structure includes an optical fiber; and
   the transmission wire further includes a reflective layer interposed between the electrical transmission structure and the optical fiber and configured to reflect an optical signal within the optical fiber.

4. The photonic integrated circuit of claim 3, wherein within the through hole, the electrical transmission structure does not completely surround the optical fiber.

5. The photonic integrated circuit of claim 2, wherein the electrical transmission structure includes a plurality of electrical transmission films electrically insulated from each other, and an insulation film formed between the electrical transmission films.

6. The photonic integrated circuit of claim 1, further comprising:
   a surface plasmon resonance (SPR) generator disposed on a surface of the transmission wire and configured to transmit an optical signal to the optical-to-electrical converter over the electrical transmission structure by a surface plasmon resonance.

7. The photonic integrated circuit of claim 6, wherein the SPR generator surrounds the transmission wire on the second surface.

8. The photonic integrated circuit of claim 6, wherein the SPR generator includes a microlens configured to refract, at a predetermined angle, the optical signal to the surface of the transmission wire.

9. The photonic integrated circuit of claim 6, further comprising a switch configured to alternately pass an electrical signal to the electrical transmission structure or pass an input optical signal to the SPR generator in response to a control signal.

10. The photonic integrated circuit of claim 6, wherein the transmission wire comprises:
    an internal wire;
    a metal layer; and
    an intermediate insulation layer surrounding the internal wire and disposed between the internal wire and the metal layer;
    wherein the SPR generator is coupled to the metal layer.

11. The photonic integrated circuit of claim 6, wherein the electrical transmission structure extends through the optical-to-electrical converter.

12. The photonic integrated circuit of claim 1, wherein:
    the transmission wire is referred to as a first transmission wire;
    the through hole is referred to as a first through hole;
    the substrate further comprises a second through hole;
    the photonic integrated circuit further comprises a second transmission wire passing through the second through hole; and
    the photonic integrated circuit is configured to receive power and ground through first transmission wire and the second transmission wire.

13. A photonic integrated circuit, comprising:
    a substrate having a first through hole and a second through hole interconnecting a first surface and a second surface;
    a first transmission wire and a second transmission wire passing through the first through hole and the second through hole, respectively, the first transmission wire including an optical transmission structure and an electrical transmission structure; and
    an optical-to-electrical converter connected to the optical transmission structure of the first transmission wire on the first surface;
    wherein:
       the first transmission wire and the second transmission wire are electrically connected or optically connected;
       the electrical transmission structure comprises an electrical terminal at the second surface configured to receive a first electrical signal; and the optical transmission structure is configured to receive an optical signal at the second surface.

14. The photonic integrated circuit of claim 13, wherein:
    the second transmission wire comprises an optical transmission line disposed in the second through hole; and
    the optical transmission line and the optical transmission structure of the first transmission wire are optically connected.

15. The photonic integrated circuit of claim 13, wherein:
    the second transmission wire comprises an electrical transmission wire disposed in the second through hole; and
    the electrical transmission wire and the electrical transmission structure of the first transmission wire are electrically connected.

16. The photonic integrated circuit of claim 13, wherein the first transmission wire and the second transmission wire are electrically connected and optically connected.

17. A photonic integrated circuit comprising:
    a first substrate having a first through hole interconnecting a first surface and a second surface of the first substrate;

a second substrate stacked on the first substrate and having a second through hole interconnecting a first surface and a second surface of the second substrate;
a first transmission wire passing through the first through hole and including an optical transmission structure and an electrical transmission structure;
an optical-to-electrical converter connected to the optical transmission structure of the first transmission wire on the first surface; and
a second transmission wire passing through the second through hole;

wherein:
the second transmission wire is electrically connected to the electrical transmission structure;
the electrical transmission structure comprises an electrical terminal at the second surface of the first substrate configured to receive a first electrical signal; and
the optical transmission structure is configured to receive an optical signal at the second surface of the first substrate.

18. The photonic integrated circuit of claim 17, wherein the second transmission wire comprises an optical transmission structure and an electrical transmission structure.

19. The photonic integrated circuit of claim 17, wherein the second transmission wire comprises:
a first electrical wire;
a second electrical wire; and
an insulator disposed between the first electrical wire and the second electrical wire.

* * * * *